United States Patent [19]
Baile et al.

[11] 3,978,221
[45] Aug. 31, 1976

[54] METHODS FOR IMPROVING THE FEED INTAKE OF MEAT PRODUCING ANIMALS

[75] Inventors: Clifton A. Baile, Glen Mills; William D. Kingsbury, West Chester; Roger C. Parish, King of Prussia, all of Pa.

[73] Assignee: SmithKline Corporation, Philadelphia, Pa.

[22] Filed: Mar. 4, 1975

[21] Appl. No.: 555,337

[52] U.S. Cl. ................................ 424/267; 424/274
[51] Int. Cl.² ................ A61K 31/445; A61K 31/40
[58] Field of Search ........................... 424/274, 267

[56] References Cited
UNITED STATES PATENTS 3,636,219  1/1972  Culik et al. .......................... 424/265

OTHER PUBLICATIONS

Schrold — Chem. Abst. vol. 76 (1972), p. 135615u.
Labey — Chem. Abst. vol. 73 (1970), p. 35238t.

*Primary Examiner*—Sam Rosen
*Attorney, Agent, or Firm*—William H. Edgerton; Richard D. Foggio; Joan S. Keps

[57] ABSTRACT

Compositions and methods for inducing polyphagia or eating in meat producing animals comprise administering orally or preferably by injection an effective but nontoxic subpharmacodynamic quantity of a benzhydryl ether active ingredient. Preferred active ingredients are tropine benzhydryl ether, 3-quinuclidinyl benzhydryl ether or their nontoxic acid addition salts.

8 Claims, No Drawings

METHODS FOR IMPROVING THE FEED INTAKE OF MEAT PRODUCING ANIMALS

This invention relates to new methods and compositions for inducing polyphagia or increased eating in food producing monogastric or ruminant farm animals, such as swine, sheep or cattle but especially in ruminants, such as sheep and cattle, using as an active ingredient one of two benzohydryl ethers. More specifically, this method comprises the internal administration, preferably to the growing animal, either orally admixed in the feed, preferably by injection, and advantageously by implant or intravenous injection of a quantity of the benzohydryl ether ingredients nontoxic or not overtly pharmacodynamic but sufficient to induce the desired feeding or polyphagia in the subject animal.

The chemicals which are the active ingredients of this invention are two chemicals which have been described generally in the art, tropine benzohydryl ether, 3-quinuclidinyl benzohydryl ether or their nontoxic acid addition salts but not to our knowledge in the art particular to this invention.

The structure of the two active ingredients of this invention are illustrated by the following formulae:

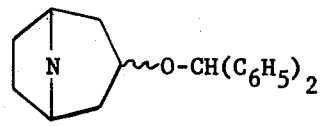

tropine benzohydryl ether

I

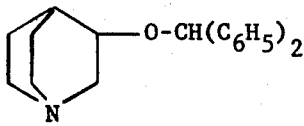

3-quinuclidinyl benzohydryl ether

II

Since the active ingredients are bases, they may be equivalently used as their nontoxic acid addition salts with pharmaceutically acceptable acids which are also made by standard methods of preparing salts, such as reacting the base in an organic solvent such as ether or benzene with an excess of the desired acid. Exemplary salts are prepared from acetic, sulfuric, hydrochloric, sulfamic, methanesulfonic, p-toluenesulfonic, pamoic, resin, nitric, phosphoric, lactic and similar acids. Water soluble or easily dispersible salt forms may be particularly useful for injectable or implant compositions.

The active compounds, such as those of Formulae I and II, are administered to the animals internally, i.e., either intramuscularly, intravenously or subcutaneously in the form of sterile veterinary solutions or suspensions for injection or preferably as veterinary pellet implants. The compounds can also be dispersed throughout conventional ruminant animal feed compositions to achieve somewhat less dramatic feeding effects. The feed compositions are then fed to animals, according to methods well-known to the agricultural art. The amount of the active ingredient in the compositions or methods of this invention will be a quantity of the benzohydryl ether sufficient to induce polyphagia or increased feeding in the animal, but preferably in the satiated immature healthy ruminant animal but not be overtly toxic or pharmacodynamic in the animal subject.

The animal feeds most generally used in conjunction with the method of this invention are either various grain mixtures and/or roughage feeds such as chopped hay commonly fed to growing ruminant animals such as cattle or sheep. The amount of additive used to supplement such feeds will be in an amount sufficient to increase feed intake and/or improve the feed efficiency of the animal but not to have a toxic or noxious effect; selected from the broad range of from about 0.1–50 mg./kg. of feed, preferably from about 0.5 mg. to about 10 mg./kg. of feed. An average feeder sheep will ingest about 3–4 lbs. of feed daily; an average feeder steer, about 20–25 lbs. The overall broad range of dosage for meat producing animals is within approximately 0.1 mg.–1 g. per day, preferably from 2.5 mg.–0.75 g. per animal per day.

The methods of this invention using parenteral administration include injecting by implant a feed inducing or polyphagic but nontoxic amount of the active ingredient such as the daily dosage quantities mentioned. Administration may be usually at most once a day, but may be varied as feeding is desired. Usually the treatment may take place every several days, weeks or even months. The implant forms of the invention might be used only one to three or four times in the growing time of the animal. They might be administered in the ear or intramuscularly in the hind quarter of the animal.

The intravenous administration of these compounds is particularly dramatic with the animal, almost immediately after injection, going to the feeder to ingest voraciously. The i. v. quantities are preferably selected from about 0.5–50 mg. quantities per sheep with proportionate amounts for other subject animals based on weight. The 3-quinuclidinyl benzohydryl ether is preferably 1–50 mg. per sheep; the tropine benzohydryl ether is preferably 0.5–20 mg. per sheep. This utility is particularly useful when a penned sick animal is being treated therapeutically for pathological anorexia. Induced eating using this method helps the animal to regain good health more swiftly.

For commercial use, the active ingredients when used in the feed can be readily used as premix formulations in which the chemical is distributed uniformly throughout a standard animal feed carrier. This premix or concentrate is then mixed with a normal diet for the animal desired. Examples of such carriers are soybean meal, corn oil, ground corn, barley, wheat mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 1–75% by weight of the premix composition.

The animal feeds themselves may also contain: roughages such as cellulose, hay, straw, silages, corn stalks, cotton seed hulls, oats, barley and cereal brans; natural oils such as animal fats, fish oils, safflower oil, peanut oil, and cottonseed oil; antioxidants, minerals, vitamins, antibiotics, anthelmintics; and other appropriate medicaments.

Examples of typical prepared animal feed are as follows:

EXAMPLE 1

| Ingredients | Weight per cent |
|---|---|
| Mixed hay | 40.0 |
| Ground yellow corn | 45.0 |
| Soybean oil meal | 7.0 |
| Cane molasses | 7.0 |
| Dicalcium phosphate | 0.5 |
| Trace mineral salts | .5 |
| Vitamin A | 300 I.U./lb. |
| Vitamin D | 150 I.U./lb. |
| Tropine benzohydryl ether hydrochloride | 5 m./lb. of feed |

The method of this invention using feed compositions comprises allowing the growing animal to graze or be fed ad libitum on the supplemented rations or to be fed on a regular schedule.

EXAMPLE 2

| Ingredients | Weight per cent |
|---|---|
| 3-Quinuclidinyl benzohydryl ether hydrate | 50 mg. |
| Calcium sulfate, dihydrate | 20 mg. |
| Gelatin | 4 mg. |
| Magnesium stearate | 1 mg. |
| Talc | 2 mg. |

The active compound and calcium sulfate, dihydrate are mixed and passed through a No. 40 standard mesh screen. The screened mixture is then granulated with hot 15% gelatin solution, screened through a No. 10 mesh screen and dried overnight at 120°F. The granules are again screened through a No. 40 mesh screen and mixed with the magnesium stearate and talc. The granules are compressed into implants using a ⅛ inch flat face punch and die. One implant is administered intramuscularly. Other standard methods of preparing and using implants are described in U.S. Pat. No. 3,428,729 and the references contained therein as well as in J. Animal Science, 27, 1772 (1968) or J. Biomed. Mater. Res., 1, 433 (1967).

The active ingredients were given by injections to either sheep or cattle in the following procedures:

Sheep I. V. Injections: Sheep were given fresh feed and 1 hour later were injected intravenously with carrier or saline dimethylsulfoxide plus drug. Feed was weighed at time of injection and 30 and 120 minutes later.

| Dose (mg.) | Animals | Feed Intake (% of control) 0–30 minutes | 0–120 minutes |
|---|---|---|---|
| Tropine benzohydryl ether methane sulfonate salt: | | | |
| 10+ | 8 | 178** | 167** |
| 20+ | 8 | 150 | 149 |
| 40+ | 8 | 164 | 172* |
| 0.31 | 16 | 141 | 86 |
| 0.62 | 16 | 133 | 147 |
| 2.5 | 16 | 294 | 226** |
| 10 | 8 | 261** | 472** |
| 3-Quinuclidinyl benzohydryl ether: | | | |
| 2.5 | 8 | 204** | 177** |
| 5 | 8 | 384** | 215** |
| 10 | 15 | 277* | 232** |
| 15 | 8 | 195** | 253 |
| 20 | 16 | 382* | 409** |
| 30 | 8 | 193* | 318** |
| 40 | 8 | 180 | 366** |

+i.p. injection; others I. V.
*Significantly different from control, p < 0.5
**Significantly different from control, p < .01

Cattle I. V. Injections: Each of four groups of cattle was given fresh feed and 1 hour later injected intravenously with carrier alone, or with carrier (dimethylsulfoxide) plus chemical. Feed was weighed at time of injection and 60 minutes later. Feed intakes were calculated for each group.

| Level (mg./steer) | % of Control Feed Intake (kg.) |
|---|---|
| Tropine benzohydryl ether methane sulfonate salt: | |
| 5 | 104 |
| 10 | 96 |
| 20 | 108 |
| 40 | 139 |
| 80 | 67* |
| 3-Quinuclidinyl benzohydryl ether: | |
| 10 | 95 |
| 40 | 184 |
| 80 | 88* |

*Overt pharmacodynamic side effects (sedation, etc.) observed.

Fourteen-Day Drug Challenge in Sheep: After being given fresh feed for 60 minutes, eight sheep were injected intravenously with 1.5 ml. of 25% dimethylsulfoxide plus 75% of 0.9% saline (control) for several days, control plus chemical for 14 days then control for several days. Feed intake was measured 60 minutes after injection and 24 hours later.

Results: The objective was to maintain increased short-term feed intake over a period of 2 weeks. This did occur as seen in the graphs. The table shows mean intakes for the three periods.

| Dose | Mean Feed Intake (g.) for 60 Minutes | | |
|---|---|---|---|
| | Pretreatment | Treatment | Post-treatment |
| 3-Quinuclidinyl benzohydryl ether: | | | |
| 10 mg. | 47±7.7 | 215±18** | 73±13 |
| Tropine benzohydryl ether methane sulfonate salt: | | | |
| 5 mg. | 30±3.6 | 168±14** | 37±13 |

**Significantly different from pretreatment mean intake, p < .001, paired-t test.

Sheep Feed Trials: Twenty-four hour intakes of a meal type feed were measured in sheep offered a ration with chemical added for 2 days. Two-day average intakes before, during and after the medicated feed were measured and were compared with paired-t tests to determine the effect of the medicated feed on intakes.

| Dose (mg./kg. feed) | Two-Day Average Intake (g.) | | | |
|---|---|---|---|---|
| | Pre-treatment | Treatment | Post-treatment | % of Pre-treatment |
| Tropine benzohydryl ether methane sulfonate salt: | | | | |
| .625 | 1641 | 1693 | 1697 | 103 |
| 2.5 | 1664 | 1710 | 1706 | 103 |
| 5.0 | 1504 | 1687 | 1578 | 107 |
| 10 | 1613 | 1656 | 1578 | 103 |

-continued

| Dose (mg./kg. feed) | Two-Day Average Intake (g.) | | | |
|---|---|---|---|---|
| | Pre-treatment | Treatment | Post-treatment | % of Pre-treatment |
| 20 | 1572 | 1555 | 1480 | 99 |
| Tropine benzohydryl ether: | | | | |
| 10 | 1275 | 1256 | 1173 | 99 |
| Tropine benzohydryl ether hydrobromide: | | | | |
| 10 | 1609 | 1541 | 1523 | 96 |
| 40 | 1542 | 1487 | 1406 | 96 |
| Tropine benzohydryl ether — Coated: | | | | |
| 2.5 | 1575 | 1585 | 1618 | 101 |
| 5.0 | 1434 | 1497 | 1432 | 104 |
| 10 | 1671 | 1669 | 1667 | 100 |
| 20 | 1475 | 1433 | 1428 | 97 |
| 3-Quinuclidinyl benzohydryl ether: | | | | |
| 10 | 1360 | 1398 | 1406 | 103 |
| 40 | 1399 | 1431 | 1441 | 102 |

Comments:

If all doses of tropine benzohydryl ether methane sulfonate salt are combined, the average of the treat periods (1664 g.) is significantly greater than that of the pretreatment (1594 g.) periods, $p < 0.02$ (104%).

What we claim is:

1. The method of inducing feeding in pigs, sheep and cattle comprising administering to said animals internally by feed composition or injection an effective feeding inducing but nontoxic quantity of tropine benzohydryl ether, 3-quinuclidinyl benzohydryl ether or their nontoxic acid addition salts.

2. The method of claim 1 in which the compound is tropine benzohydryl ether or one of its nontoxic, stable acid addition salts.

3. The method of claim 1 in which the compound is 3-quinuclidinyl benzohydryl ether or one of its nontoxic, stable acid addition salts.

4. The method of claim 1 in which the administration is intravenously to sheep or cattle.

5. The method of claim 4 in which the administration is intravenously to sheep being treated therapeutically for pathological anorexia.

6. The method of claim 2 in which the administration is intravenously to sheep and the dose is selected from the range of about 0.5–20 mg. per sheep.

7. The method of claim 3 in which the administration is intravenously to sheep and the dosage is selected from the range of about 1–50 mg. per sheep.

8. The method of claim 1 in which the administration is by implant.

* * * * *